US011890656B2

(12) United States Patent
Josse et al.

(10) Patent No.: US 11,890,656 B2
(45) Date of Patent: Feb. 6, 2024

(54) PROCESS FOR RECOVERING ORGANICS FROM MATERIAL RECOVERY FACILITY FINES

(71) Applicant: ANAERGIA INC., Burlington (CA)

(72) Inventors: Juan Carlos Josse, Aliso Viejo, CA (US); Andrew Benedek, Rancho Santa Fe, CA (US)

(73) Assignee: ANAERGIA INC., Burlington (CA)

( * ) Notice: Subject to any disclaimer, the term of this patent is extended or adjusted under 35 U.S.C. 154(b) by 276 days.

(21) Appl. No.: 16/497,407

(22) PCT Filed: Mar. 23, 2018

(86) PCT No.: PCT/CA2018/050358
§ 371 (c)(1),
(2) Date: Sep. 24, 2019

(87) PCT Pub. No.: WO2018/176126
PCT Pub. Date: Oct. 4, 2018

(65) Prior Publication Data
US 2020/0101506 A1    Apr. 2, 2020

Related U.S. Application Data

(60) Provisional application No. 62/477,122, filed on Mar. 27, 2017.

(51) Int. Cl.
*B30B 9/04*    (2006.01)
*B09B 3/00*    (2022.01)
*B09B 3/80*    (2022.01)

(52) U.S. Cl.
CPC . *B09B 3/80* (2022.01); *B30B 9/04* (2013.01)

(58) Field of Classification Search
CPC .... B30B 9/02; B30B 9/04; B30B 9/06; B30B 9/062; B30B 9/065; C02F 3/00;
(Continued)

(56) References Cited

U.S. PATENT DOCUMENTS 3,506,414 A * 4/1970 Skendrovic ............... B03B 9/06
44/589
3,858,504 A    1/1975 Boyer
(Continued)

FOREIGN PATENT DOCUMENTS

AU    2011339363 A1    9/2013
CN    104070051 A    10/2014
(Continued)

OTHER PUBLICATIONS

European Patent Application No. 18776672.0, Extended European Search Report dated Dec. 11, 2020.
(Continued)

*Primary Examiner* — Jimmy T Nguyen
(74) *Attorney, Agent, or Firm* — Borden Ladner Gervais LLP; Michael Damiani

(57) ABSTRACT

A system and process for separating organic material from solid waste such as material recovery facility (MRF) fines is disclosed. The fines are treated in a press, in which the fines are compressed against a wall having a set of holes. The fines are mixed with a substantial amount of water before being pressed. The water increases the amount of organic matter that is recovered from the fines. A wet fraction, extruded through the holes of the press, may be treated in an anaerobic digester.

13 Claims, 1 Drawing Sheet

(58) Field of Classification Search
CPC ........ C12M 45/02; B09B 3/0016; B09B 3/00; B09B 3/80; B29B 17/02; B29B 2017/0217; B29B 2017/0279; Y02W 30/40; Y02W 30/62; B03B 9/06
See application file for complete search history.

(56) References Cited

U.S. PATENT DOCUMENTS

| | | | | |
|---|---|---|---|---|
| 3,910,775 | A * | 10/1975 | Jackman | C02F 11/12 44/589 |
| 5,431,702 | A * | 7/1995 | Schulz | C02F 11/13 44/552 |
| 5,797,972 | A * | 8/1998 | Schulz | C10L 5/14 44/552 |
| 7,410,583 | B2 | 8/2008 | Gray et al. | |
| 7,473,285 | B2 * | 1/2009 | Russell | B01J 3/008 44/605 |
| 7,989,011 | B2 | 8/2011 | Newkirk et al. | |
| 2001/0013197 | A1 * | 8/2001 | White | C10L 5/14 44/552 |
| 2005/0109697 | A1 * | 5/2005 | Olivier | C02F 3/34 210/610 |
| 2008/0020456 | A1 | 1/2008 | Choate et al. | |
| 2013/0316428 | A1 | 11/2013 | Gonella | |

FOREIGN PATENT DOCUMENTS

| | | | |
|---|---|---|---|
| CN | 105457971 A | 4/2016 | |
| EP | 3121261 A1 | 1/2017 | |
| FR | 2838989 A1 * | 10/2003 | ............... B09B 3/00 |
| GB | 2541076 A | 2/2017 | |

OTHER PUBLICATIONS

United Kingdom Patent Application No. GB1706156.5, Office Action dated Dec. 9, 2020.
Singapore Patent Application No. SG20191108956T, Office Action dated Aug. 31, 2020.
International Patent Application No. PCT/CA2018/050358, International Preliminary Report on Patentability dated Oct. 10, 2019.
International Patent Application No. PCT/CA2018/050358, International Search Report and Written Opinion dated Jun. 12, 2018.
European Patent Application No. 18776672.0, European Office Action dated Dec. 1, 2022.

* cited by examiner

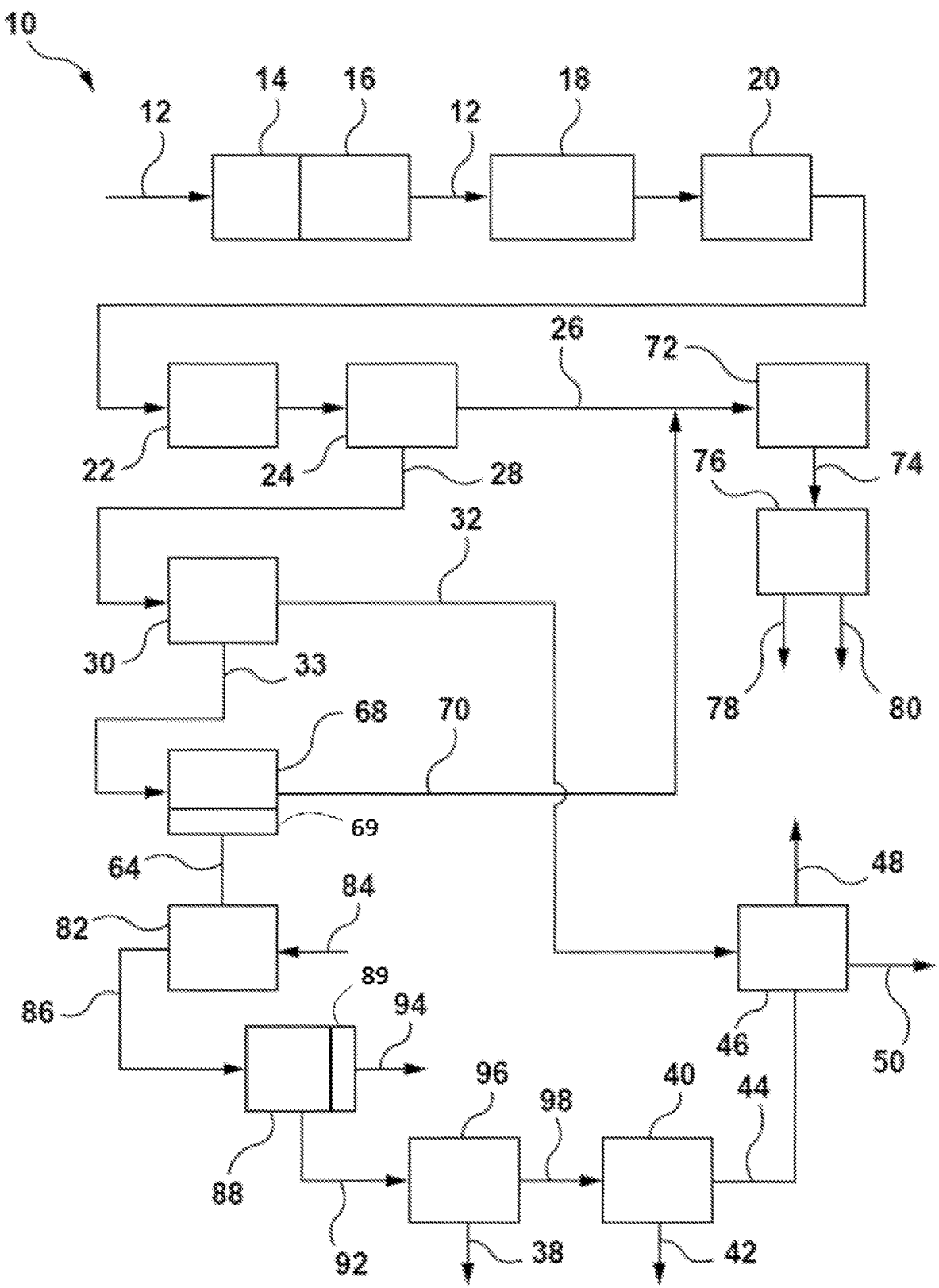

PROCESS FOR RECOVERING ORGANICS FROM MATERIAL RECOVERY FACILITY FINES

CROSS-REFERENCE TO RELATED APPLICATIONS

This application is a National Stage Entry of International Application No. PCT/CA2018/050358, filed Mar. 23, 2018, which is a non-provisional application of U.S. Application Ser. No. 62/477,122, filed Mar. 27, 2017.

FIELD

This specification relates to recovering organic material from waste such as municipal solid waste (MSW).

BACKGROUND

A material recovery facility (MRF) receives waste, such as MSW, and sorts the waste into various components. Some of the components are glass, plastic, metal or paper products that can be recycled. Other components are generally dry materials that can be burned as refuse derived fuel (RDF) or solid recovered fuel (SRF) to generate heat or electricity. Other components are organic and can be used for compost or converted into methane in an anaerobic digester.

US Publication 2013/0316428 describes a process in which an organic fraction containing biological cells is separated from solid urban waste. The organic fraction is extruded through a grid having small-bore holes, under a pressure higher than the burst pressure of the cell membranes. The cells are disrupted and a gel of a doughy consistency is produced. The gel is then loaded into a biodigester, where it is readily attacked by bacteria. The press may be as described in European Publication Nos. 1207040 and 1568478. In general, these presses use a plunger to compress waste that has been loaded into a cylinder. The sides of the cylinder are perforated with radial holes. Another suitable press is described in International Publication Number WO 2015/053617, Device and Method for Pressing Organic Material Out of Waste.

INTRODUCTION

Many conventional MRFs produce a waste stream of fines. The fines are small (i.e. 2" (51 mm) or less) pieces or aggregates of waste that pass though the screens and other sorting devices in the MRF. The fines typically contain a mixture of inorganic material and organic material. The fines are typically landfilled but, because they contain a material amount of organic material, can only be accepted in some landfills or with payment of high tipping fees.

This specification describes a system and process for separating organic material from the fines. The fines are treated in a press, in which the fines are compressed in a chamber that has holes in one or more of its walls. However, the inventors have observed that simply pressing the fines recovers only a small part of their organic matter. Without intending to be bound by theory, it may be that the large amount of inert matter, such as glass or grit, either increases the viscosity of the flowable portion of the fines or produces a structure that resists compression. In the system and process described herein, the fines are mixed with a substantial amount of water before being pressed. This increases the amount of organic material that is recovered from the fines. A wet fraction, extruded through the holes of the press, may be treated in an anaerobic digester. The dry fraction may be landfilled.

BRIEF DESCRIPTION OF THE FIGURES

FIG. 1 is a schematic drawing of a solid waste treatment system.

DETAILED DESCRIPTION

A materials recovery facility (MRF) typically produces at least one waste stream that combines organic and inorganic material. The organic material may make up at least 25%, for example 25-75%, of the dried solids (DS) of the waste stream. At least some of the inorganic material is usually non-recyclable, for example grit. In some cases, the waste stream is the "fines", i.e. material that falls through a 2" (51 mm) or smaller rectangular, i.e. square, mesh opening or round hole of a screen or trammel.

A system and process described herein can be used to extract organics from MRF fines or other waste MRF waste streams. In some cases, at least 60% of the organic material in the fines can be extracted. The extracted organic material can be sent to an anaerobic digester to produce biogas. Removing the organic material can also reduce the cost of landfilling the remaining waste, reduce the weight of material that has to be hauled from the MRF, and reduce the amount of leachate generated when the waste is landfilled.

A press is used to extract organic material from the fines or other solid waste. In the press, the solid waste is compressed and a wet fraction of the solid waste is extruded through a set of holes in one or more walls of the press. The holes can have a diameter of, for example, between 4 mm and 12 mm, or about 8 mm. The press can operate at high pressure, for example 50 bar or more or 150 bar or more, which is sufficient to rupture cells in the organic material. Rupturing the cells helps organic material flow through the holes. However, MRF fines tend to be dry with a significant amount of dense, rigid material such as broken glass or grit. It is difficult to mobilize a large proportion of the organics in the fines into the wet fraction. There appears to be too much viscosity, or other flow inhibiting factors, to allow most of the organics to flow though the matrix of compressed waste to the holes.

To address the problems described above, water is added to the fines before pressing the fines. The water and fines can be mixed together in a cement mixer, a compost mixer with horizontal or vertical augers in a bin, or another suitable mixer. The mixing time is optionally 15 minutes or more or 30 minutes or more. The amount of water added is preferably at least 33%, at least 50%, or at least 100% of the fines by mass. When a mixture of water and the fines is pressed, more of the organics in the fines are mobilized to the wet fraction.

FIG. 1 shows an example of a system 10 for treating solid waste 12. Solid waste 12, which may be for example municipal solid waste (MSW), is collected in trucks and dumped in piles in a tipping floor or pit 14. A loader or grapple places the waste into a dosing feeder 16 that feeds waste 12 into a processing line conveyor at a generally consistent rate suitable for the downstream processes. The waste 12 travels on the conveyor through a pre-sorting area 18. In the pre-sorting area 18, large un-bagged bulky items and other non-processible materials (such as furniture, rolls of chain-link fence, carpets, toilet bowls, furniture, etc.) are manually removed from the conveyor.

The waste 12 continues from the pre-sorting area 18 and drops into a bag opener 20. The bag opener 20 opens plastic garbage bags. For example, the bag opener 20 may use a coarse tearing shredder, for example a single or double shaft shredder with a 200 mm spacing, to open the bags. The waste 12 with opened bags is then placed on another conveyor.

The waste 12 continues on the conveyor below an overbelt magnet 22 to remove large ferrous metal items. The waste 12 then passes through a coarse screen 24. The coarse screen 24 may be, for example, a disc or roller screen with 100-150 mm openings. The coarse screen 24 retains some of the waste 12, for example about 30-40%, as coarse screen overs 26. The coarse screen overs 26 contain mostly large, generally dry, items of waste. The remaining 60-70% of the waste 12 passes through the coarse screen 24 and becomes coarse screen unders 28. The coarse screen unders 28 contain mostly wet or organic matter such as food waste, small containers and some inerts. In an efficient coarse screening process, about 95% of food waste in the waste 12 may end up in the coarse screen unders 28.

The coarse screen unders 28 are treated to remove some organic material. For example, the coarse screen unders 28 can be milled under high force shearing, pressing, hammering, or pulverizing in order to dislodge material and separate an organic fraction 32 from rejects 33. In the example shown, a hammer mill 30 dislodges organics from the coarse screen unders 28 and breaks large organic pieces into small particles or, optionally, produces a slurry. In some cases, the mill may require dilution of the coarse screen unders 28. The organic fraction 32 can be separated from the rejects 33 by a screen integrated with the hammer mill 30 that retains the rejects 33 and permits the passage of the organic fraction 32 driven by the hammering or other shearing force. Alternatively, the pulverized mixture of organics and rejects can pass through the hammer mill 30 and into a screw press that separates the organic fraction 32 from the rejects 33 through a screen. Optionally, the hammer mill 30 and any associated screen may be replaced with a second press 88 as described below or by using the same press 88 described below to produce organic fraction 32 and rejects 33.

The rejects 33 may be removed from the system 10 as fines. Alternatively, as in the example shown, the rejects 33 are sent to a vibrating screen 68, trammel or other separating device. The vibrating screen 68 may have 30 mm to 51 mm round or square openings 69. Inerts and remaining organic materials fall through the vibrating screen 68 as fines 64. In another alternative, the hammer mill 30 and vibrating screen 68 are replaced by a single trammel screen with holes of multiple sizes. After front end pre-sorting and coarse shredding, for example as described above, the waste is processed in the trammel screen. Some of the waste passes through smaller holes (i.e. 2" (51 mm) or less) in the front of the trammel while other waste passes through larger holes (i.e. up to 8" (205 mm)) in th rest of the trammel. Fines 64 fall through the smaller holes and are collected on a separate conveyor. Waste that falls through the larger holes can be processed as described for vibrating screen overs 70 below.

Vibrating screen overs 70 are combined with coarse screen overs 26. This waste may be shredded and sent to an incinerator such as a stoker boiler plant. Alternatively, one or both of the coarse screen overs 26 and the vibrating screen overs 70 may pass through additional recyclable recovery units to recover solids such as plastic bottles, bags, fabric, and paper. Recyclables can be recovered, for example by manual separation, optical sorters or ballistic separators. An eddy current separator can be used to remove pieces of non-ferrous metals, if any. A drum magnet may be used to remove pieces of ferrous material metal, if any. The combined overs 26, 70 then pass through a wind sorter 72. In the wind sorter 72, air nozzles blow material from one belt to another over a gap. RDF fluff 74 flies over the gap. Dense material, i.e. rocks, falls into the gap and is sent to landfill.

The RDF fluff 74 has about 25% moisture and contains plastic, paper, textiles, other dry fibers, etc. RDF fluff 74 can be burned as RDF to recovery heat or electricity or both. Optionally, the RDF fluff 74 goes to an optical sorter 76. The optical sorter 76 separates plastic and other non-cellulosic material from cellulosic material such as wood and paper. Near infrared sensors determine if matter is cellulosic or not. Air jets then separate the RDF fluff 74 into cellulosic fluff 78 and non-cellulosic 80 fluff with about 85-95% efficient separation. Non-cellulosic fluff 80 can be combusted to recover heat or electricity or converted to bio-oil or syngas by pyrolysis. Cellulosic fluff 78 can be combusted to recover heat or electricity, further treated to recover pulp, or sent to a pyrolysis unit to produce syngas or digestible pyrolysis liquid.

The fines 64 are sent to a mixer 82 and thoroughly mixed with water 84 to produce wet fines 86. The mixing time is optionally 15 minutes or more or 30 minutes or more. The amount of water added is preferably at least 33%, at least 50%, or at least 100% of the fines by mass.

The wet fines 86 are sent to a press 88. The press 88 compresses the wet fines 86 at high pressure through perforations in an otherwise enclosed extrusion chamber. For example, the pressure may be at least 50 bar or otherwise sufficient to move organic material in the wet fines 86 through the perforations and optionally to burst cells. The perforations may be, for example, 4 to 20 mm diameter circular holes or holes of other shapes with a comparable area 89. The extrusion chamber can have a cylindrical or square cross section with the holes 89 located in one or more fixed or moving walls of the chamber. The press 88 separates the wet fines 86 into a wet fraction 92, which passes through the perforations, and rejects 94 that remain in the extrusion chamber after compression. Rejects 94 may be sent to a landfill.

The press 88 may be as described in International Publication Number WO 2015/053617, Device and Method for Pressing Organic Material Out of Waste, or as described in European Publication Nos. 1207040 and 1568478, all of which are incorporated herein by reference. Suitable presses include the VM 2000, OREX and BIOREX presses sold by DB Technologies or Anaergia. Other presses may also be used.

The wet fraction 92 passes into a polisher 96. In the polisher 96, the wet fraction 92 is fed into a screen cylinder surrounding a rotor. Particles of organic matter in the wet fraction 92 are flung outward from the rotor by its rotating movement and centrifugal forces. The particles of organic material are discharged through perforations in the screen to a first discharge opening. Air flowing along the axis of the rotor carries lighter material past the perforations to a second discharge opening. The airflow may be created by the rotor blades or by a separate fan. The rotor blades may optionally also scrape the inside of the screen. In this way, lighter particles (particularly bits of plastic) are separated from the organic particles in the wet fraction 92. The polisher 96 thereby produces polished wet fraction 98 and floatables 38. The floatables 38 include small pieces of plastic and paper that would tend to collect at the top of an anaerobic digester. A suitable polisher 96 is described in International Publication Number WO 2015/050433, which is incorporated herein by reference. A similar polisher is sold as the DYNAMIC CYCLONE by DB Technologies. Floatables 38 can be sent to landfill or optionally combined with rejects 33.

The polished wet fraction 98 is treated in a grit removal unit 40. The grit removal unit 40 preferably includes a hydro-cyclone. Water may be added if required to dilute the polished wet fraction 98 to bring its solids content to or below the maximum solids content accepted by the grit removal unit 40. The grit removal unit 40 removes grit 42 large enough to settle in an anaerobic digester. Separated grit 42 is sent to landfill, optionally after rinsing it. One suitable grit removal unit is the PRO:DEC system by CD Enviro.

Degritted wet fraction 44 is sent to an anaerobic digester 46, alternatively referred to as a digester for brevity. The digester 46 may have one or more mixed covered tanks. Suitable digesters are sold under the Triton and Helios trade marks by UTS Biogas or Anaergia. The digester 46 produces product biogas 48 which may, for example, be used to produce energy in a combined heat and power unit or upgraded to produce biomethane. The digester 46 also produces sludge 50, alternatively called digestate. The sludge 50 can be dewatered, optionally dried, and landfilled or pyrolized, or used as compost or applied to land. Digester 46 can also process organics 32. The organics 32 can optionally be extruded through press 88 to produce a wet fraction that is sent to digester 46.

In an experimental trial, fines (<2 inch or 51 mm) from an MRF plant processing MSW were treated in a test scale press. In a first set of trials, no water was added to the MRF fines before they were pressed. A 52.5 lb mass of fines was split into three samples of 17.5 lbs each. The three samples were pressed one at a time, removing the retained fines from the press between pressings, and produced a total of 10.3 lbs of fines, or about 20%, in the wet fraction. In a second set of trials, 48.9 lbs. of fines was mixed with 25 lbs. of water in a motorized cement mixer for 30 minutes to produce a 73.9 lb mass of wet fines. The wet fines were split into four samples ranging from 17.3 to 19.4 lbs. The four samples were pressed one at a time, removing the retained fines from the press between pressings, and produced a total of 44.9 lbs in the wet fraction. If it assumed for calculations that none of the added water remained in the press (which is unlikely to be correct but conservative) then 19.9 lbs of fines, or about 41%, were produced in the wet fraction. In a second set of trials, 49.7 lbs. of fines was mixed with 50 lbs. of water in a motorized cement mixer for 30 minutes to produce a 99.7 lb mass of wet fines. The wet fines were split into six samples ranging from 17.3 to 19.4 lbs. The six samples were pressed one at a time, removing the retained fines from the press between pressings, and produced a total of 82.0 lbs in the wet fraction. If it is assumed for calculations that none of the added water remained in the press (which is unlikely to be correct but conservative) then 32.0 lbs of fines, or about 64%, were produced in the wet fraction. It appears that adding water helps to mobilize organics into the wet fraction. Without intending to be limited by theory, it could be that adding water reduces the viscosity of the organics and or provides more time for the organics to travel though the rejects matrix formed during extrusion inside the extrusion chamber of the press.

We claim:

1. A process comprising steps of,
   mixing water with solid waste comprising fines producing a mixture having at least 50% water by mass per unit mass of the fines; and,
   pressing the resulting mixture at a pressure of at least 50 bar in an extrusion chamber.

2. The process of claim 1 wherein the fines have a size and shape that allows the fines to pass through a rectangular opening that is 51 mm or less on each side, or a round opening of 51 mm or less in diameter.

3. The process of claim 1 wherein the solid waste comprises at least 25% organic material by dry mass.

4. The process of claim 1 wherein the water and solid waste are mixed for at least 15 minutes.

5. The process of claim 1 wherein one or more walls of the extrusion chamber has holes with an area equal to the area of a circle with a diameter in a range of 4 mm to 20 mm.

6. The process of claim 1 wherein the fines comprise organic material and inert matter.

7. The process of claim 1 wherein the step of pressing the resulting mixture is at a pressure of at least 150 bar.

8. The process of claim 1 wherein the step of pressing comprises compressing the resulting mixture through holes in one or more walls of the extrusion chamber.

9. A system for treating solid waste comprising fines, comprising:
   a mixer,
   a supply of water in communication with the mixer, and
   a high pressure extrusion press configured to exert a pressure of at least 50 bar on a mixture of the solid waste and the water from the mixer, the mixture having at least 50% water by mass per unit mass of solid waste the fines,
   wherein the mixer is configured to mix water from the supply of water with the solid waste in an amount of at least 50% water by mass per unit mass of solid waste.

10. The system of claim 9 further comprising a material recovery facility adapted to produce fines from solid waste, wherein the mixer receives the fines.

11. The system of claim 9 further comprising a screen or trammel having a rectangular opening of 51 mm or less on each side, or a round opening of 51 mm or less in diameter, wherein the screen or trammel unders outlet is in communication with the mixer.

12. The system of claim 9 wherein one or more walls of the extrusion press has holes with an area equal to the area of a circle with a diameter in a range of 4 mm to 20 mm.

13. The system of claim 9 wherein the extrusion press exerts a pressure of at least 150 bar on the mixture.

* * * * *